R. H. KEATON.
TIRE GROOVING AND FINISHING MACHINE.
APPLICATION FILED DEC. 27, 1917.
1,304,485.
Patented May 20, 1919.
2 SHEETS—SHEET 1.
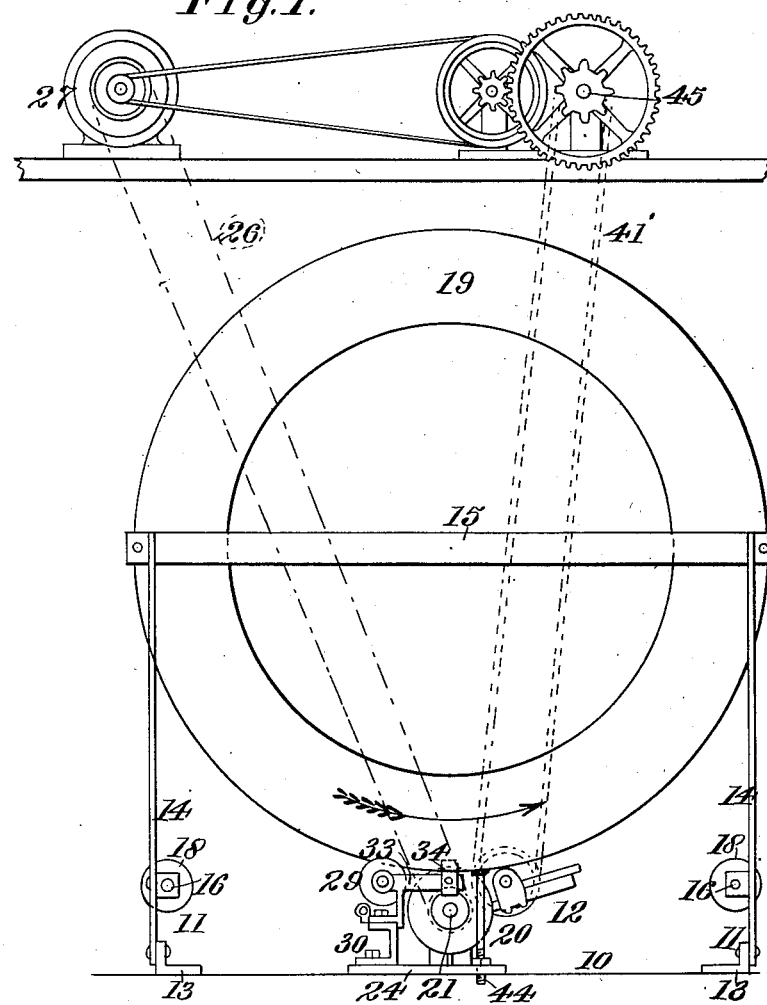
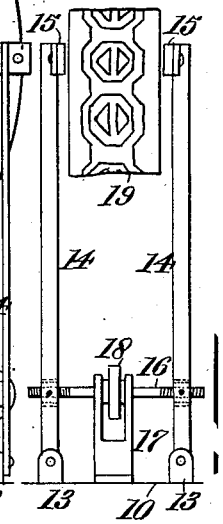
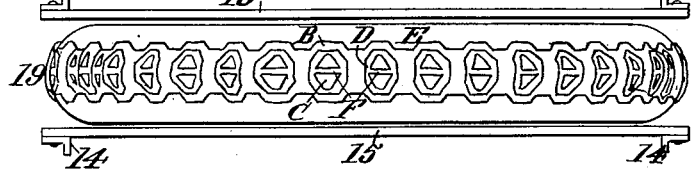
Inventor
Robert H. Keaton,
By Strong & Townsend
ATTORNEYS R. H. KEATON.
TIRE GROOVING AND FINISHING MACHINE.
APPLICATION FILED DEC. 27, 1917.
1,304,485.
Patented May 20, 1919.
2 SHEETS—SHEET 2.
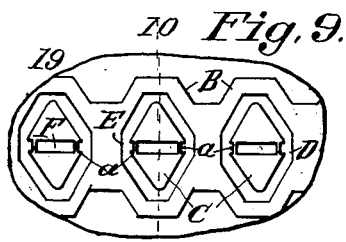
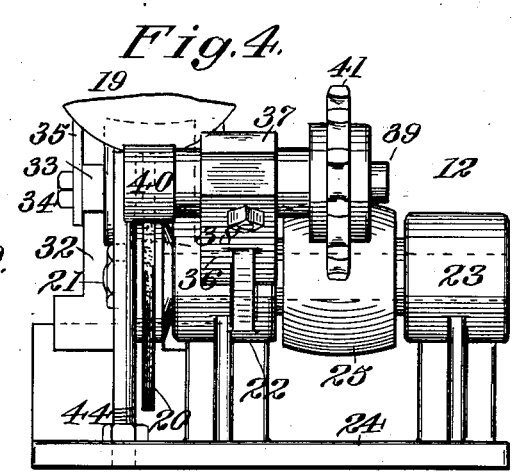
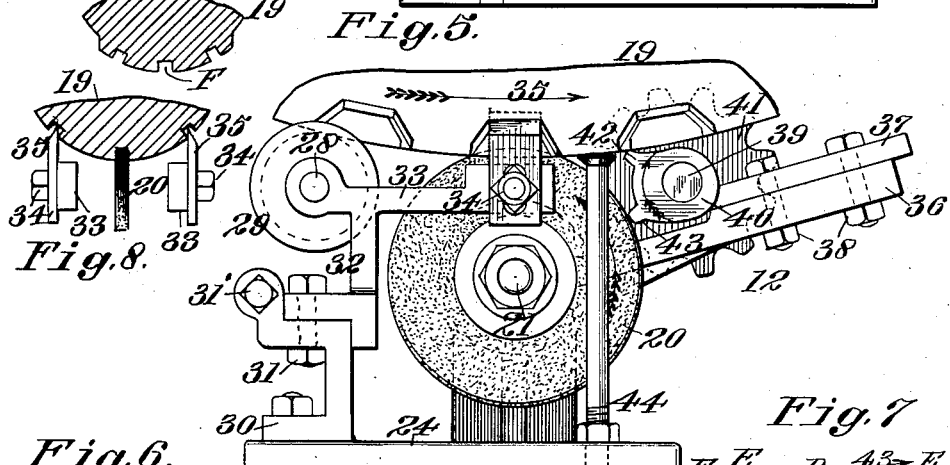
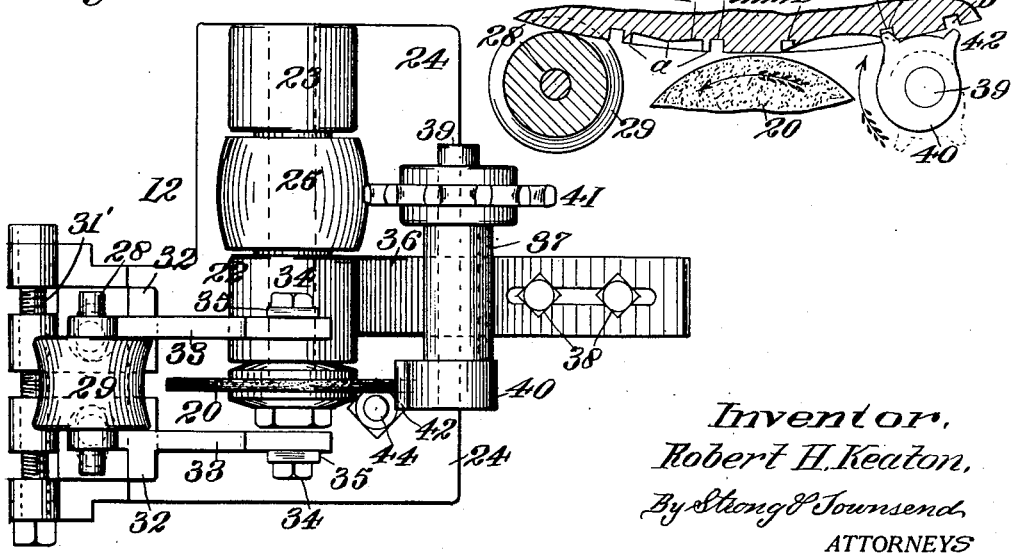
Inventor,
Robert H. Keaton,
By Strong & Townsend,
ATTORNEYS

UNITED STATES PATENT OFFICE.

ROBERT H. KEATON, OF SAN FRANCISCO, CALIFORNIA.

TIRE GROOVING AND FINISHING MACHINE.

1,304,485.  Specification of Letters Patent.  Patented May 20, 1919.

Application filed December 27, 1917. Serial No. 209,071.

*To all whom it may concern:*

Be it known that I, ROBERT H. KEATON, citizen of the United States, residing at the city and county of San Francisco and State of California, have invented new and useful Improvements in Tire Grooving and Finishing Machines, of which the following is a specification.

This invention relates to a machine for grooving and finishing tires, and pertains especially to means for finishing or forming tires of the non-skid, depression type shown in my Patent No. 979,961, dated December 27th, 1910, and my Design Patent No. 50,352, dated February 26th, 1917. Said patents disclose essentially a tire having a tread portion with a central circumferential groove bounded by opposed triangular areas which are divided from the rest of the tread surface by oppositely inclined grooves. These various grooves converge into one another so that a figure which is substantially polygonal in shape is formed by these grooves; the tread surface being flush and the depressions being below the surface of the tread so that there is produced what is known as the "Keaton" non-skid depression type of tire, these tires having gone into extensive commercial use.

In the manufacture of these tires, it is usual to mold these grooves into the tire, but in the molding and due to the characteristics of rubber it is not possible or practicable to make the central groove perfect. That is to say, there are imperfections and unevennesses in the central, circumferential groove which should be removed before the tire goes into use. Usually these imperfections include a thin rubber fin running centrally into the groove made by the sectional mold and small rubber ties across the ends of the central groove whereby the flow of rubber from one side of the groove to the other is facilitated. Also as a rule the central portion of the groove is shallower than at the ends. The present invention is designed to finish and true up these grooves.

It is evident that the machine may be adapted for cutting grooves of various shapes and designs, when desired, and it is not intended that the present invention should be limited to any particular design of tire nor any tread surface formed thereupon.

An object of this invention is to provide a mechanism which is readily accessible to the operator and allows him to easily place the tire in cutting position within the machine and to quickly remove it therefrom without the use of clamping means or other fasteners.

Another object of the invention is to provide means for automatically rotating the tire either continuously or intermittently and to lock the tire against movement during the cutting operation when the feed is intermittent.

The manner in which I carry out my invention is illustrated in the accompanying drawings, in which—

Figure 1 is a view in side elevation, illustrating the complete machine with a tire in operative position therein.

Fig. 2 is a view in end elevation, corresponding to Fig. 1.

Fig. 3 is a view in plan, disclosing the guide members for removably supporting the tire during the cutting operation.

Fig. 4 is an enlarged view in end elevation, illustrating the complete cutting head and further disclosing a fragmentary portion of a tire in proper position thereon.

Fig. 5 is a fragmentary view in side elevation, illustrating the cutter head, as shown in Fig. 4, and further disclosing the intermittent feeding mechanism and the tire locking members.

Fig. 6 is a view in plan, illustrating in detail the cutter head and the manner in which it may be adjusted to accommodate tires of various sizes.

Fig. 7 is a fragmentary view in section of the tire tread, disclosing the feed action with the particular design of tire shown in the drawings.

Fig. 8 is a view in transverse section, illustrating the locking fingers as engaging the side grooves of the tire during the cutting operation.

Fig. 9 is a fragmentary view of the tire tread with which the present form of the invention is adapted to operate.

Figs. 10 and 11 are fragmentary views in transverse section, illustrating the tire tread before and after the cutting operation.

Referring more particularly to the drawings, 10 indicates a suitable base, upon which a tire rack 11 and a cutting head 12 are secured. The tire rack 11 is here shown as composed of fixed brackets 13, disposed in pairs at opposite sides of the cutting head 12 and in spaced relation to each other along opposite sides of a center line passing through the cutting member of head.

Pivotally supported upon these brackets 13 are vertical uprights 14, to the upper ends of which horizontal guide bars 15 are secured. These bars are held in suitable spaced relation to each other by an adjusting screw 16 extending through a threaded opening in each of the uprights. The adjusting screws are mounted through central brackets 17 where they are held for rotation by thumb-nuts 18. Thus it will be seen that manipulation of the thumb-nut will cause simultaneous movement of the bars 15 toward and away from each other, due to the use of right and left-handed threads upon the opposite ends of the screws. This rack is provided as a guide for a tire 19, which may be of solid rubber, or, as shown in the present instance, a pneumatic casing, the tread portion of which is disclosed in detail in Fig. 3.

As the mechanism here shown is especially designed to operate upon tires of this character further attention is directed to Figs. 3 and 9 of the drawings in which it will be seen that the tread surface of the tire is molded with depressions, substantially hexagonal in configuration, and which lie with their centers along the equatorial center of the casing.

It is desirable that the portions $a$—$a$—$a$, indicated in Fig. 9, be cut away to form a more perfect gripping surface of the angular tread portions B and C. Central grooves of proper depth cannot conveniently be formed within the curing mold, due to the fact that the mold separates along this line, as will be understood. For the purpose of cutting away the portions $a$—$a$—$a$ upon the tread of the tire an abrasive cutter 20 is provided and is mounted upon a spindle 21 which is held for rotation within journal bearings 22 and 23. These bearings are shown as being formed integral with a base plate 24. The cutter 20 is thus held in vertical alinement and may be rotated by a pulley 25 suitably driven by a belt 26 which is connected with a power transmitting means, here shown as a motor 27.

The direction of rotation of the cutter is indicated in Fig. 5, where it will be seen that its action is contrary to the direction of rotation of the tire. Disposed upon a spindle 28, in vertical alinement with the spindle 21, is a concaved supporting roller 29, upon which the tire is adapted to rest and by which it will be steadied. This roller is adjustably held for longitudinal and lateral movement upon an adjustable bracket 30 by a bolt 31 and right and left-hand screw 31', thus allowing tires of various diameters to be accommodated.

The support for the spindle 28 is composed of two brackets 32 which are fitted with horizontally extending arms 33. The bolts 31 also allow these brackets to be adjusted transversely of the machine. Clamping bolts 34 extend through the outer ends of the arm 33 and are in superposed vertical relation to the axis of the cutter spindle 21. These bolts are adapted to receive and hold combined centering and locking fingers 35, one of which is secured against the outer face of each of the arms and extends upwardly into the opposite recess of the tire tread, as shown in Fig. 8. Suitably slotted openings are formed through these fingers and afford them vertical adjustment when desired.

Extending outwardly from the base of the machine and upon the opposite side of the cutter from the roller 29 is a rigid arm 36 which carries a bearing 37 held upon the arm for horizontal adjustable movement by bolts 38. This bearing rotatably supports a timing shaft 39, at the outer end of which is fixed a feed cam 40, and at the opposite end a driving sprocket 41.

The feed cam, as particularly shown in Fig. 5, has an eccentric graduated arcuate surface extending substantially two-thirds of its circumference, by which the tire is gradually let down onto the cutter. The enlarged portion of the cam provides the feed fingers 42 and 43. 44 is a stop to limit the depth of the cut; this stop consisting of a mushroom headed bolt fixed to a stationary part of the frame. This feed or timing cam is positioned in the same plane as the cutter and the roller 29, its fingers being adapted to register with the end depressions D and E of the tread portion. It will be understood that the diameter of this cam and the spacing of the two fingers in relation to each other will be determined by the size of the tire and the proportions of its tread design. For this reason different cams will be necessary for different types of tires and may be interchangeably mounted upon the timing shaft 39.

The sprocket 41 is in mesh with a suitable sprocket chain 41' which passes around a sprocket upon a reduction shaft 45. This shaft is in turn driven by suitable gearing receiving power from the motor 27. The variation in speed between the spindle 21 and the timing shaft 39 will, of course, be determined by the design of the tire tread and the circumference of the tire.

In operation, the power transmitting mechanism is connected, as previously described, and when the shafts 28 and 39 have been properly adjusted in relation to the cutter spindle 21 the mechanism will be ready for use. A tire is then placed between the bars 15 of the rack with the depressions of the tread in proper register with the fingers 31. This will insure that the tire will be held against circumferential and transverse movement. As the cutter 20 rotates, the tire will be fed by its own weight against the periphery of the cutter and will allow the portions a—a—a to be successively cut away; the stop 44 limiting the depth of the cut.

When a groove F is cut and cleaned out, for as here shown the sides of the groove must be cut as well as small cross portions separating the groove F from the grooves D and E, the tire is automatically lifted and rotated to bring the next groove down onto the cutter by the action of a finger 42. The cam 40 thus engages the transverse depression D in the tread to raise the tire, causing it momentarily to elevate the tire and move it forward. In this position the tire will be supported upon the roller 29 and the longer portion of cam 40, thus holding it clear of the cutter. As the cam continues to rotate the finger 42 will move the tire around until another groove is directly above the cutter 20. At this time the finger 43 will be in register with the transverse depression E and as the cam rotates it continues to support the tire and gradually to feed the tire down upon the grinding face of the cutter. This operation will then be performed automatically until the entire circumference of the tread has been shaped as desired.

It will be evident that by using locking fingers of other shapes and by disposing one or more cutters in various positions in relation to each other that an unlimited number of depressions or grooves may be cut upon a tire tread irrespective of whether they have been previously molded therein or not. With this idea in view it is not my intention to limit myself to any particular performance of the machine.

Having thus described my invention, what I claim and desire to secure by Letters Patent is—

1. A machine for grooving tires which consists in a rotary cutter operating in a plane parallel with that of the tire, means for supporting a tire in said parallel plane and for rotating the tire to intermittently bring the outer circumferences of the cutter and tire into contact to produce a successive series of grooves extending circumferentially of the tire.

2. Means for forming circumferentially extending depressions at intervals around the circumference of a tire, which consists of a support for the tire, a cutter arranged approximately to the periphery of the tire and in a plane parallel to the transverse axis of the tire, means for moving the tire into and out of contact with the cutter, and means for intermittently rotating the tire during the non-cutting operation.

3. A machine for forming a non-skid surface upon the tread of a tire, comprising a tire support, a cutting member, and feed means for moving the tire in relation to the cutting member, whereby a series of grooves will be formed upon the tread of the tire around the circumference thereof.

4. A machine for forming a non-skid surface upon the tread of a tire comprising a tire support, a cutting member, and feed means for intermittently moving the tire to cause grooves to be formed upon the tread surface of the tire by the cutter and at intervals throughout its circumferential length.

5. A machine for forming a non-skid surface upon the outer circumference of a tire, comprising a tire support, a cutting member over which the tire is supported, and means for intermittently lowering the tire into engagement with the cutting member, whereby a groove will be cut upon the tread surface of the tire.

6. A machine for forming a non-skid surface upon a tire, comprising a rotary cutter, guide means for steadying a tire above said rotary cutter, means whereby the tire may be normally allowed to rest upon the cutting edge of said cutter, and operating means, whereby the tire may be intermittently supported and fed over the face of the cutter.

7. A machine for forming a non-skid surface upon a tire, comprising a rotary cutter, guide means for steadying a tire above said rotary cutter, means whereby the tire may be normally allowed to rest upon the cutting edge of said cutter, and feed means, whereby said tire may be intermittently raised from the cutter and moved in relation thereto.

8. In a machine for forming a non-skid surface upon the tread of a tire, a guide rack between the members of which the tire may freely move, and means incorporated therein, whereby said rack may be adjusted to accommodate tires of various sectional widths and hold them in constant relation to a common vertical axis.

9. In a machine for forming a non-skid surface upon a tire, a rotating cutting member upon which the tire rests by its own weight, means for intermittently relieving the tire from the face of the cutting member, and means for locking the tire in position when said intermittently operating means is inactive.

10. In a tread-forming machine, a cutter head comprising a rotary cutting member, a roller rotatably secured adjacent thereto and at one side thereof, whereby a tire may be supported upon the roller and the edge of the cutting member, and means for raising the surface of the tire from engagement with the cutting members, whereby it will be supported by said roller and said means during a feed operation.

11. In a machine of the class described, a vertically disposed, rotatable cutter, a supporting roller having its axis parallel to that of the cutter and positioned with its transverse center in the same plane as the cutter, a feed cam disposed on the opposite side of the cutter and in the plane specified, means whereby said feed cam may intermittently and simultaneously lift and rotate a tire normally resting upon the roller and the periphery of the cutter, and means whereby the subsequent lowering of the tire by said cam will allow it to be automatically locked against transverse or circumferential movement.

12. In a machine of the class specified, a tire rack, between the members of which a tire is held in a vertically alined position, a rotating cutting member disposed at the bottom of said rack and against which the surface of a tire is adapted to rest, a roller at one side of said cutting member upon which the periphery of the tire continuously bears, a cam upon the opposite side of the cutting member having an arcuate eccentric surface for gradually feeding the tire onto the cutter, means incorporated within said cam for lifting and advancing the tire a predetermined distance, means for locking the tire against movement when lowered upon the cutter, and adjustable means incorporated within the machine whereby tires of various shapes and designs may be accommodated.

13. A machine for circumferentially grooving tires which comprises a continuously rotating cutter, means for maintaining the tire in a plane parallel to that of the cutter and supporting the tire in a manner to permit the circumferential edges of the tire and cutter to come into contact, whereby circumferentially extending grooves may be cut in the tire and a combined supporting and feed member adapted to alternately rotate the tire a fraction of its circumferential length and to intermittently force the tire into contact with the cutting member, whereby a succession of grooves will be cut around the tire.

14. In tire grooving machines, the combination of means for supporting a tire for rotation upon its axis, of a cutter approximate to the periphery of the tire, and means for intermittently bringing the tire and cutter into co-acting relation to form a broken circumferential groove on the tread surface of the tire.

In testimony whereof I have hereunto set my hand in the presence of two subscribing witnesses.

ROBERT H. KEATON.

Witnesses:
GEORGE KEATON,
FRANK T. FAIRCLOTH.